(12) United States Patent
Cajigas et al.

(10) Patent No.: US 11,160,265 B2
(45) Date of Patent: Nov. 2, 2021

(54) INSECT TRAP UTILIZING UV LIGHT AND METHOD OF USE THEREOF

(71) Applicant: Philip Morris USA Inc., Richmond, VA (US)

(72) Inventors: Lizbel I. Cajigas, Richmond, VA (US); Hoc V. Nguyen, Richmond, VA (US); Peter Edde, Richmond, VA (US); Anh N. Dinh, Richmond, VA (US); David Gabriel Bustos, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 519 days.

(21) Appl. No.: 15/945,295

(22) Filed: Apr. 4, 2018

(65) Prior Publication Data
US 2019/0307114 A1    Oct. 10, 2019

(51) Int. Cl.
*A01M 1/10* (2006.01)
*A01M 1/08* (2006.01)
*A01M 1/14* (2006.01)
*A01M 1/04* (2006.01)
*A01M 1/02* (2006.01)

(52) U.S. Cl.
CPC .............. *A01M 1/145* (2013.01); *A01M 1/02* (2013.01); *A01M 1/04* (2013.01); *A01M 1/106* (2013.01); *A01M 1/14* (2013.01); *A01M 1/08* (2013.01)

(58) Field of Classification Search
CPC ............ A01M 1/04; A01M 1/10; A01M 1/14; A01M 1/145; A01M 1/106
USPC ............................................. 43/113, 114, 107
See application file for complete search history.

(56) References Cited

U.S. PATENT DOCUMENTS 4,332,100 A * 6/1982 Schneider .............. A01M 1/08
                                                    43/113
4,949,501 A * 8/1990 Larkin ................. A01M 1/145
                                                    43/113
5,425,197 A    6/1995 Smith
                (Continued)

FOREIGN PATENT DOCUMENTS

WO    WO-2018008923 A1 * 1/2018 .............. A01M 1/08

OTHER PUBLICATIONS

Katsuki, Masako et al., "Which wavelength does the cigarette beetle, *Lasioderma serricrne* (Coleoptera: Anobiidae), prefer? Electrophysiological and behavioral studies using light-emitting diodes (LEDs)", published online Jul. 25, 2013, The Japanese Society of Applied Entomology and Zoology (2013), 5 pages.
(Continued)

*Primary Examiner* — Darren W Ark
*Assistant Examiner* — Kevin M Dennis
(74) *Attorney, Agent, or Firm* — Harness, Dickey & Pierce, P.L.C.

(57) ABSTRACT

An insect trap useful for trapping flying insects, the insect trap comprising an upper housing including at least one horizontal row of light emitting diodes extending across an outer surface of a curved front wall such that light from each of the light emitting diodes is projected outwardly from the upper housing at a different angle than adjacent light emitting diodes in the horizontal row of light emitting diodes, a base housing including an opening through which insects can enter an interior of the base housing, and an insect trapping element facing the opening in the base housing.

20 Claims, 4 Drawing Sheets

(56) References Cited

U.S. PATENT DOCUMENTS

| | | | |
|---|---|---|---|
| 5,505,017 A | 4/1996 | Nelson et al. | |
| 5,722,199 A | 3/1998 | Demarest et al. | |
| 6,041,543 A | 3/2000 | Howse | |
| 6,108,965 A | 8/2000 | Burrows et al. | |
| 6,289,629 B2 * | 9/2001 | Greening | A01M 1/04 43/113 |
| 6,393,759 B1 * | 5/2002 | Brown | A01M 1/023 43/113 |
| 6,493,986 B1 | 12/2002 | Nelson et al. | |
| 6,550,181 B1 | 4/2003 | Ray | |
| 7,143,542 B2 * | 12/2006 | Taylor | A01M 1/145 43/113 |
| 7,784,215 B2 * | 8/2010 | Cohnstaedt | A01M 1/04 43/112 |
| 7,937,887 B2 * | 5/2011 | Child | A01M 1/08 43/139 |
| 8,242,701 B1 * | 8/2012 | Fall | F21V 19/003 315/185 R |
| 8,276,314 B2 | 10/2012 | Duehl et al. | |
| 8,402,691 B2 * | 3/2013 | Coventry | A01M 1/06 43/139 |
| 8,677,677 B2 | 3/2014 | Schneidmiller et al. | |
| 8,858,607 B1 | 10/2014 | Jones | |
| 9,109,765 B2 | 8/2015 | Rieger | |
| 9,717,228 B2 | 8/2017 | Koo et al. | |
| 10,104,879 B2 * | 10/2018 | McGowan | A01M 1/223 |
| 2003/0154644 A1 * | 8/2003 | Lambert | A01M 1/145 43/107 |
| 2005/0126069 A1 * | 6/2005 | Taylor | A01M 1/145 43/113 |
| 2006/0080888 A1 | 4/2006 | Greening | |
| 2007/0056208 A1 * | 3/2007 | Chen | A01M 1/08 43/113 |
| 2008/0229652 A1 | 9/2008 | Willcox et al. | |
| 2008/0256843 A1 | 10/2008 | Hack et al. | |
| 2009/0025275 A1 * | 1/2009 | Cohnstaedt | A01M 1/04 43/113 |
| 2009/0094883 A1 * | 4/2009 | Child | A01M 1/023 43/112 |
| 2009/0288333 A1 | 11/2009 | Johnston et al. | |
| 2011/0109235 A1 | 5/2011 | Link | |
| 2011/0283597 A1 * | 11/2011 | Coventry | A01M 1/08 43/107 |
| 2011/0289822 A1 | 12/2011 | Duehl et al. | |
| 2011/0296740 A1 | 12/2011 | Yamada et al. | |
| 2013/0169146 A1 | 7/2013 | Aoki et al. | |
| 2013/0204581 A1 | 8/2013 | Park et al. | |
| 2014/0027800 A1 | 1/2014 | Preuschl | |
| 2014/0223803 A1 | 8/2014 | Hariyama et al. | |
| 2014/0305027 A1 | 10/2014 | Israely et al. | |
| 2017/0006847 A1 * | 1/2017 | McGowan | A01M 1/223 |
| 2017/0094960 A1 | 4/2017 | Sasaki et al. | |
| 2017/0295772 A1 | 10/2017 | Studer et al. | |
| 2018/0116195 A1 * | 5/2018 | Zhang | F21V 3/02 |
| 2019/0133106 A1 * | 5/2019 | Eom | A01M 1/10 |
| 2019/0313619 A1 * | 10/2019 | Lee | A01M 1/06 |

OTHER PUBLICATIONS

Miyatake, Takahisa et al. "Monitoring and Detecting the Cigarette Beetle (Coleoptera: Anobiidea) Using Ultraviolet (LED) Direct and Reflected Lights and/or Pheromone Traps in a Laboratory and a Storehouse" Journal of Economic Entomology, 2016, 1-10 doi:10.1093/jee/tow225, pp. 1-10.

* cited by examiner

INSECT TRAP UTILIZING UV LIGHT AND METHOD OF USE THEREOF

FIELD OF INVENTION

The embodiments disclosed herein relate generally to insect traps.

BACKGROUND

Traps baited with pheromones lures are widely used for monitoring *Lasioderma Serricorne* (Fabricius) commonly known as the cigarette beetle. Such traps can attract male cigarette beetles but not female cigarette beetles. Thus, there is a need for traps which are effective in trapping male and female cigarette beetles.

SUMMARY

According to an embodiment, an insect trap useful for trapping flying insects comprises an upper housing including at least one horizontal row of light emitting diodes extending across an outer surface of a curved front wall such that light from each of the light emitting diodes is projected outwardly from the upper housing at a different angle than adjacent light emitting diodes in the horizontal row of light emitting diodes, a base housing including an opening through which insects can enter an interior of the base housing, and an insect trapping element facing the opening in the base housing.

According to various optional aspects of the insect trap, the insect trapping element can be a glue board located in the interior of the base housing or a container attached to a bottom wall of the base housing. For example, the glue board can be a planar glue board oriented at an angle to the back wall of the base housing. In one arrangement, the glue board can be a planar glue board oriented at an angle to the back wall of the base housing. In such an arrangement, the base housing can include an inclined wall having one end adjacent a front wall of the base housing and an opposite end adjacent a bottom of the back wall of the base housing with the glue board supported on an upper surface of the inclined wall. Alternatively, if the insect trapping element is a container attached to a bottom wall of the base housing, the base housing can include a funnel shaped bottom wall having a cylindrical extension at a bottom thereof with the container removably attached to the cylindrical extension.

According to various optional aspects of the insect trap, the upper housing can include a back wall, a left side wall, a right side wall, a top wall, a bottom wall and the curved front wall, the top and bottom walls oriented parallel to each other and connected to the back wall, the side walls being oriented parallel to each other and connected to side edges of the top and bottom walls, the top wall having a curved front edge extending outwardly away from the side edges of the top wall such that a midpoint of the curved front edge is at least four times further from the back wall than opposite ends of the curved front edge, the bottom wall having a curved front edge extending outwardly away from the side edges of the bottom wall such that a midpoint of the curved front edge is at least four times further from the back wall than opposite ends of the curved front edge, the curved front wall mounted in a recess between the top and bottom walls such that an outer surface of the curved front wall is spaced inwardly from the curved front edges of the top and bottom walls.

According to various optional aspects of the insect trap, the base housing can include a back wall, left and right side walls, a front wall and a bottom wall, with upper ends of the back wall, side walls and front wall forming a rectangular opening through which insects can enter the interior of the base housing.

According to various optional aspects of the insect trap, an inner surface of the back wall of the base housing can include an insect attracting component. For example, the inner surface of the back wall of the base housing can include an insect attracting component such as a yellow surface on an inside surface of the back wall of the base housing. If the back wall of the base housing is part of a rectangular frame located inside the base housing adjacent the rectangular opening, the insect attracting component can comprise a yellow surface of the rectangular frame extending around the inside of the rectangular opening.

According to various optional aspects of the insect trap, the upper housing can include a multi-position switch configured to adjust power supplied to the horizontal row of light emitting diodes such that when the switch is in a first position only some of the light emitting diodes receive power and when the switch is in a second position all of the light emitting diodes receive power. In another arrangement, the at least one horizontal row of light emitting diodes comprises two horizontal rows of light emitting diodes and the upper housing includes a multi-position switch configured to adjust power supplied to the horizontal rows of light emitting diodes such that when the switch is in a first position half of the light emitting diodes receive power, when the switch is in a second position all of the light emitting diodes receive power.

According to various optional aspects of the insect trap, the upper housing can include first and second horizontal rows of light emitting diodes, the first horizontal row of light emitting diodes located above the second horizontal row of light emitting diodes and/or the upper housing can include circuitry to supply the at least one horizontal row of light emitting diodes with DC power and each of the light emitting elements emits ultraviolet (UV) light at about the same wavelength. In an example, all of the light emitting diodes can emit UV light at a wavelength of about 370 to 380 nm.

According to another embodiment, a method of trapping cigarette beetles comprises supporting the insect trap on an interior wall of a tobacco storage facility, supplying power to the horizontal row of light emitting diodes so as to project UV light in an arc outwardly of the curved front wall of the upper housing, and trapping cigarette beetles with the insect trapping component. For example, the insect trapping component can be a glue board and the method can include replacing the glue board after a predetermined period of time. Alternatively, the base housing can include a funnel shaped bottom wall made of sheet metal and the insect trapping component can be a container attached to the funnel shaped bottom wall, and the method can include stunning the cigarette beetles due to impact with the metal surfaces of the funnel shaped bottom wall and collecting the stunned cigarette beetles in the container.

DETAILED DESCRIPTION

Figure 1:
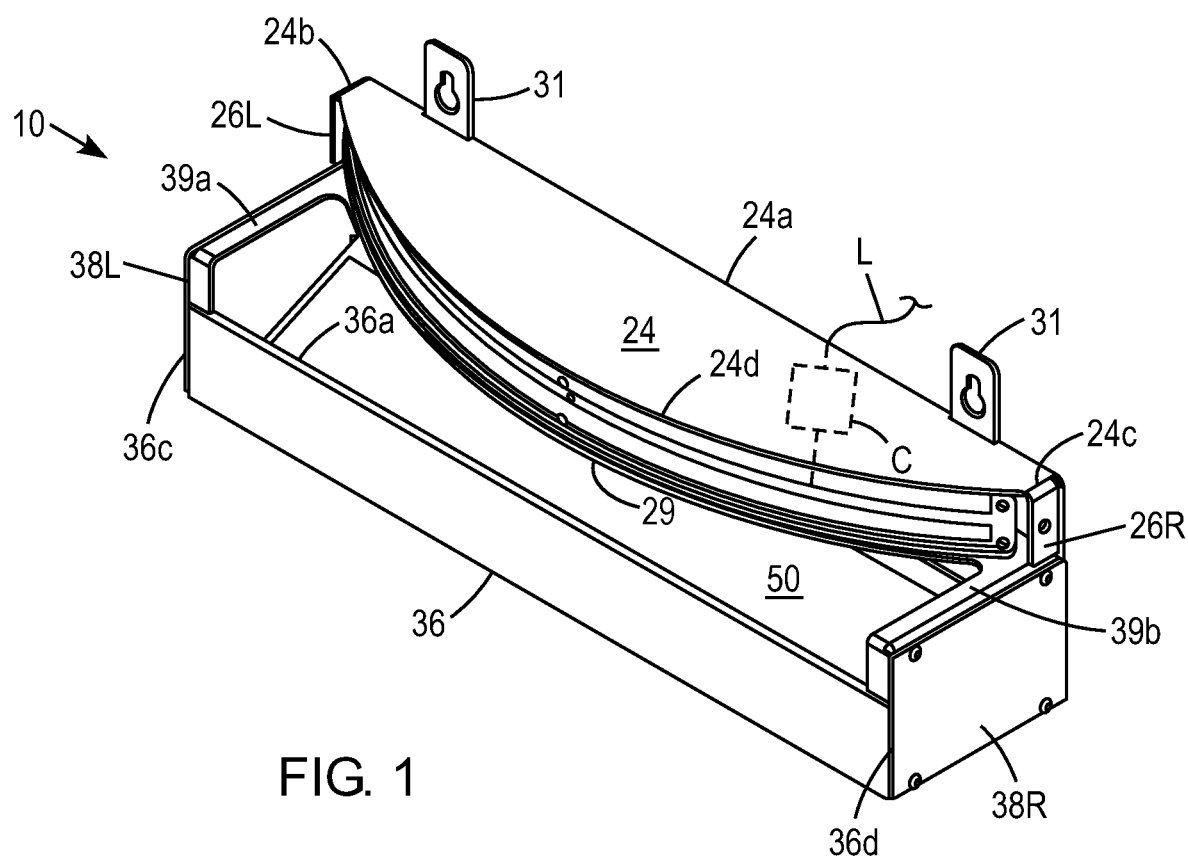
FIG. 1 shows a perspective view of an insect trap having a glue board in accordance with an embodiment.

In the tobacco industry, the cigarette beetle has been known to cause extensive damage to tobacco being stored in tobacco storage facilities. Traps baited with pheromones lures have been used for monitoring *Lasioderma serrricorne* (Fabricius) commonly known as the cigarette beetle. However, pheromones lures only attract male cigarette beetles. There are no known methods commercially available to capture female cigarette beetles. Disclosed herein is an insect trap which has been found effective in trapping male and female cigarette beetles. The insect trap can capture male and female cigarette beetles without the use of pesticides which makes the insect trap useful in manufacturing facilities where the use of pesticide is prohibited.

It has been discovered that the female cigarette beetle is attracted to ultra violet (UV) light with a specific wavelength of 375 nm. In an embodiment, an insect trap useful for capturing male and female cigarette beetles utilizes 375 nm UV lights and a cigarette beetle trapping component such as a glue board or container attached to the insect trap. However, the insect trap can use different wavelengths such as LEDs operating at the 340 to 650 nm range and/or the insect trap can be used to capture other insects such as such as insects that infest grain like the grain weevil (*sitophilus* spp.), the indianmeal moth (*Plodia interpunctella*), or confused flour beetle (*Triolim confusum*).

In accordance with an embodiment, the insect trap includes an upper housing including at least one horizontal row of light emitting diodes extending across an outer surface of a curved front wall such that light from each of the light emitting diodes is projected outwardly from the upper housing at a different angle than adjacent light emitting diodes in the horizontal row of light emitting diodes, and a base housing including an opening through which insects can enter an interior of the base housing, and an insect trapping element facing the opening in the base housing.

FIGS. 1-4 illustrate an insect trap 10 in accordance with a first embodiment. The insect trap includes an upper housing 20 which includes a light source and a base housing 30 beneath the upper housing 20. The upper housing 20 is smaller than the base housing 30 and is configured to overlie the base housing 30 such that an interior of the base housing 30 is accessible through an opening 50 which extends through a front wall and a top wall of the base housing 30. Thus, light from the upper housing 20 is directed outwardly of the upper housing 20 to attract insects into the opening 50. In an embodiment, the insect trap 10 does not include any pesticides and instead uses only light to attract insects such as the cigarette beetle into the insect trap 10 and physically trap the insects with a sticky substance inside the insect trap 10.

The upper housing 20 includes a curved front wall 22, a top wall 24, a left sidewall 26L, a right sidewall 26R, and a back wall 28. The top wall 24 can be a D-shaped planar wall having a straight back edge 24a, straight side edges 24b, 24c and a curved front edge 24d. The left and right sidewalls 26L, 26R can be planar rectangular walls which have about the same width as the side edges 24b, 24c and extend downwardly from the side edges 24c, 24d so as to be perpendicular to the top wall 24 and back wall 28. The back wall 28 can be a planar rectangular wall which extends downwardly from the back edge 24a and is perpendicular to the top wall 24. The curved front wall 22 can have a uniform height and extend downwardly adjacent the curved front edge 24d of the top wall 24. To emit UV light radially outwardly, the curved front wall 22 can be an arcuate segment of an elliptical or cylindrical wall. As an example, the curved front wall 22 can be mounted such that it follows the contour of the front edge 24d of the top wall 24 and the front edge 24d can be a segment of a large diameter circle having a diameter equal to or larger than the width of the back wall 28. Thus, if the back wall has a width of about 16 inches, the radius of the front edge 24d can be about 8 inches or larger such as about 8 to 10 inches, about 10 to 12 inches or about 12 to 14 inches. However, the front edge 24d and front wall 22 can have different dimensions and/or shapes if desired.

The base housing 30 includes a bottom wall 32, a back wall 34, a front wall 36, a left sidewall 38L, a right sidewall 38R, and top wall 39. The bottom wall 32 can be a planar rectangular wall having the same width as the upper housing 20. The side walls 38R, 38L can be planar rectangular walls having a height which is larger than a height of the upper housing 20. The front wall 36 can be a planar rectangular wall having a height which is smaller than the side walls 38L, 38R such that the opening 50 includes the space above the top edge 36a of the front wall 36. The front wall 36 extends upwardly from the bottom wall 32 with a bottom edge of the front wall 36 adjacent a front edge of the bottom wall 32b. The front wall 36 has side edges 36c, 36d adjacent the side walls 38L, 38R and the front wall 36 is perpendicular to the side walls 38L, 38R. The back wall 34 is a planar rectangular wall having the same width as the upper housing 20 and the same height as the side walls 38L, 38R. The top wall 39 can be a planar wall having a thin rectangular left leg 39a extending along the top of the left side wall 38L, a thin rectangular right leg 39b extending along the top of the right side wall 38R, and a large center section 39c which closes the underside of the upper housing 20. The top wall 39 includes rounded corners 39d, 39e connecting the left and right legs 39a, 39b to the center section 39c. However, the planar walls of the upper housing 20 and the base housing 30 can have non-planar shapes, if desired.

Figure 2:
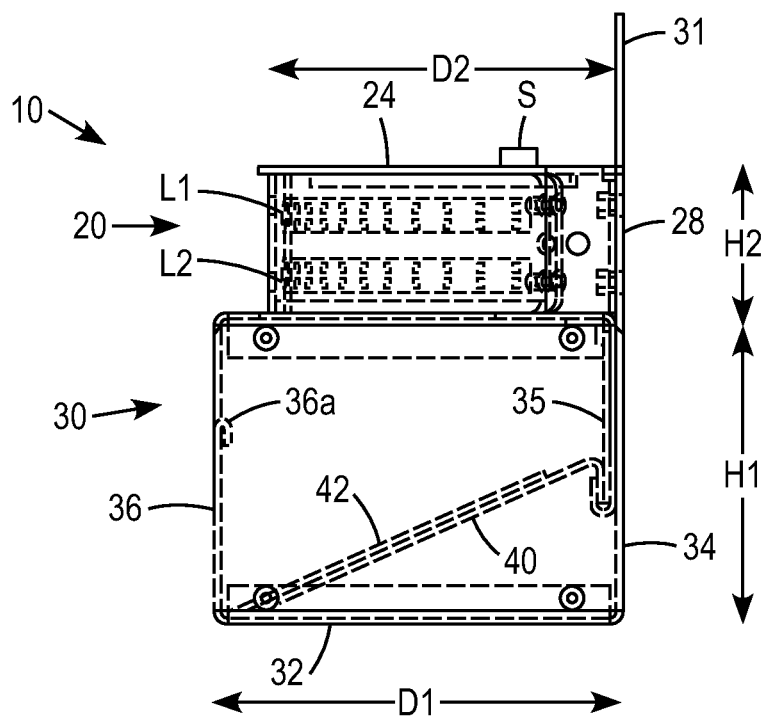
FIG. 2 shows a side view of the insect trap shown in FIG. 1.
Figure 3:
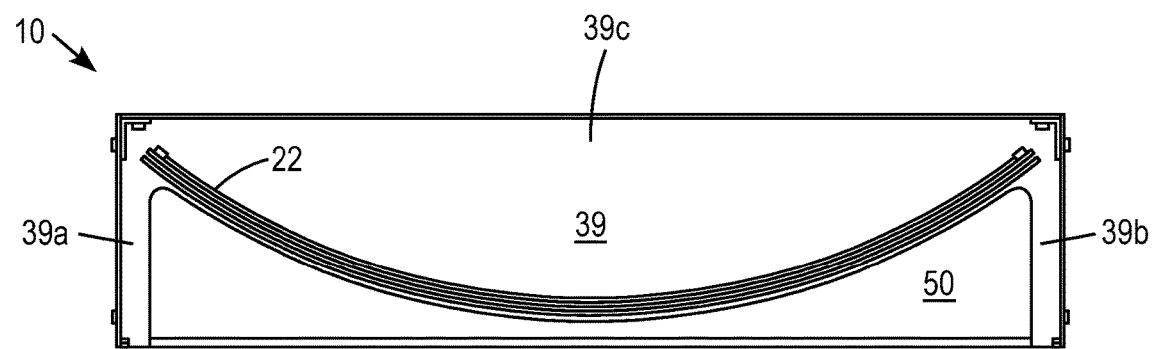
FIG. 3 is a top view of the insect trap shown in FIG. 1.
Figure 4:
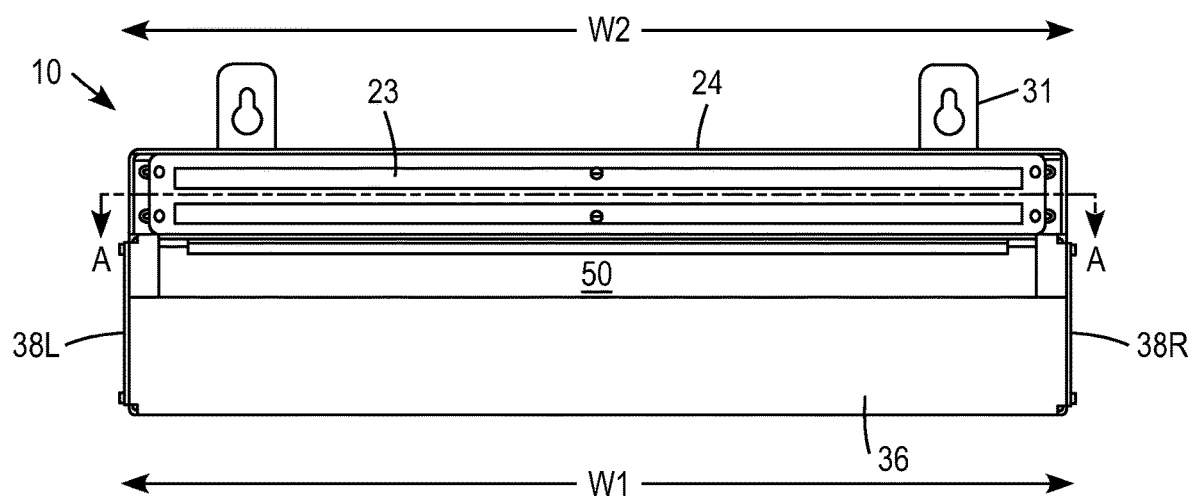
FIG. 4 is a front view of the insect trap shown in FIG. 1

As shown in FIG. 2, an inner back wall 35 extending part way down the back wall 34 can be configured to engage one end of an inclined wall 40 facing the opening 50. For example, the lower end of the inner back wall 35 can be bent upwardly to form a recess and the upper end of the inclined wall 40 can be bent downwardly to form a projection which fits in the recess. To attract insects into the base housing 30, the inner surface of the inner back wall 35 can provided with a surface which attracts the insects to be trapped. In the case of the cigarette beetle, the support wall 35 can have a yellow surface facing the opening 50. The inclined wall 40 can be oriented at an acute angle such as about 15 to 20°, about 20 to 30°, about 30 to 40°, about 40 to 50° or about 50 to 60°. As an example, the inclined wall 40 can be oriented at an angle of about 25° to the bottom wall 32. The inclined wall 40 can be used to support a removable sticky glue pad 42 on its upper surface so that insects entering the interior of the base housing 30 can be trapped on the glue pad 42. The inclined wall 40 and glue pad 42 can be integrated into a replaceable component of the insect trap 10 or the glue pad 42 can be a flexible glue pad which is removable through the opening 50 and a new glue pad can be inserted through the opening 50 so as to be mounted on the inclined wall 40. Thus, the glue pad 42 can be replaced with a new glue pad periodically.

For an insect trap 10 sized for mounting on a wall, the upper housing 20 can include mounting brackets 31 extending upwardly from the top wall 24. For use in a tobacco storage facility, the base housing 30 and upper housing 20 can have any desired dimensions. In an exemplary insect trap 10, the base housing 30 can have a width "W1" of about 16 inches, a depth "D1" of about 4 inches, and a height "H1" of about 3 inches and the upper housing 20 can have a width "W2" of about 16 inches, a depth "D2" at its widest point of about 3.5 inches, and a height "H2" of about 1.5 inches. With such dimensions, a single insect trap 10 can be used to cover a large area. For example, the insect trap 10 can be used in a tobacco warehouse to trap cigarette beetles in an area of 1000 to 5000 square feet.

As shown in FIGS. 1-2, the upper housing 20 can have the same width as the base housing 30 but due to the curved front wall 22, the opening 50 in the top of the base housing 30 is smallest at the center and becomes wider towards the sidewalls of the base housing 30. The curved front wall 22 allows light from the upper housing 20 to be projected outwardly in an arc so as to attract insects from further distances than would otherwise if the upper housing had a straight front wall.

While the base housing 30 and upper housing 20 can have any desired dimensions, in an exemplary insect trap 10, the base housing 30 can be rectangular with a have a depth D1 of about 4 inches and the upper housing 20 can have a variable depth D2 of about 0.5 inch at opposite ends and about 3.5 inches at its center. Preferably, the back wall 28 of the upper housing 20 and the back wall 34 of the base housing 30 are vertically aligned in the same plane and the curved front wall 22 of the upper housing 20 is configured such that the center of the curved front wall 22 is set back about 0.5 inch from the front wall 36 of the base housing 30 and opposite ends 22*b* of the curved front wall 22 are spaced about 0.5 inch from the back wall 28.

The outer surface of the curved front wall 22 of the upper housing 20 can include one or more light sources such as one or more arrays of light emitting diodes (LEDs) which emit light at one or more wavelengths. A preferred wavelength for attracting male and female cigarette beetles is about 375 nm. However, the light source can emit light at any desired wavelength or wavelength range. For flying insects, a preferred range of wavelengths is from about 340 nm to about 650 nm. Further, while LEDs can be used as the light source, other light sources providing ultraviolet (UV) or other wavelengths of light can be used, if desired.

The light source can be two strips of LED lights arranged horizontally with an upper row of lights L1 and a lower row of lights L2. The light strips can be activated by suitable switching to activate all of the lights or less than all of the lights. For example, via suitable switching circuitry C, the light strips can be activated by a multi position switch S which turns on a first group of lights, a second position which turns on a second group of lights, and a third position which turns on a third group of lights. If each strip includes 75 LEDs, with such a switch it is possible to turn on 50 lights, 100 lights or 150 lights and thus adjust for desired lighting conditions in the location that the insect trap is used. The circuitry C can convert AC power supplied through a 120 volt AC power line L to DC power suitable for powering the light emitting diodes.

Figure 5:
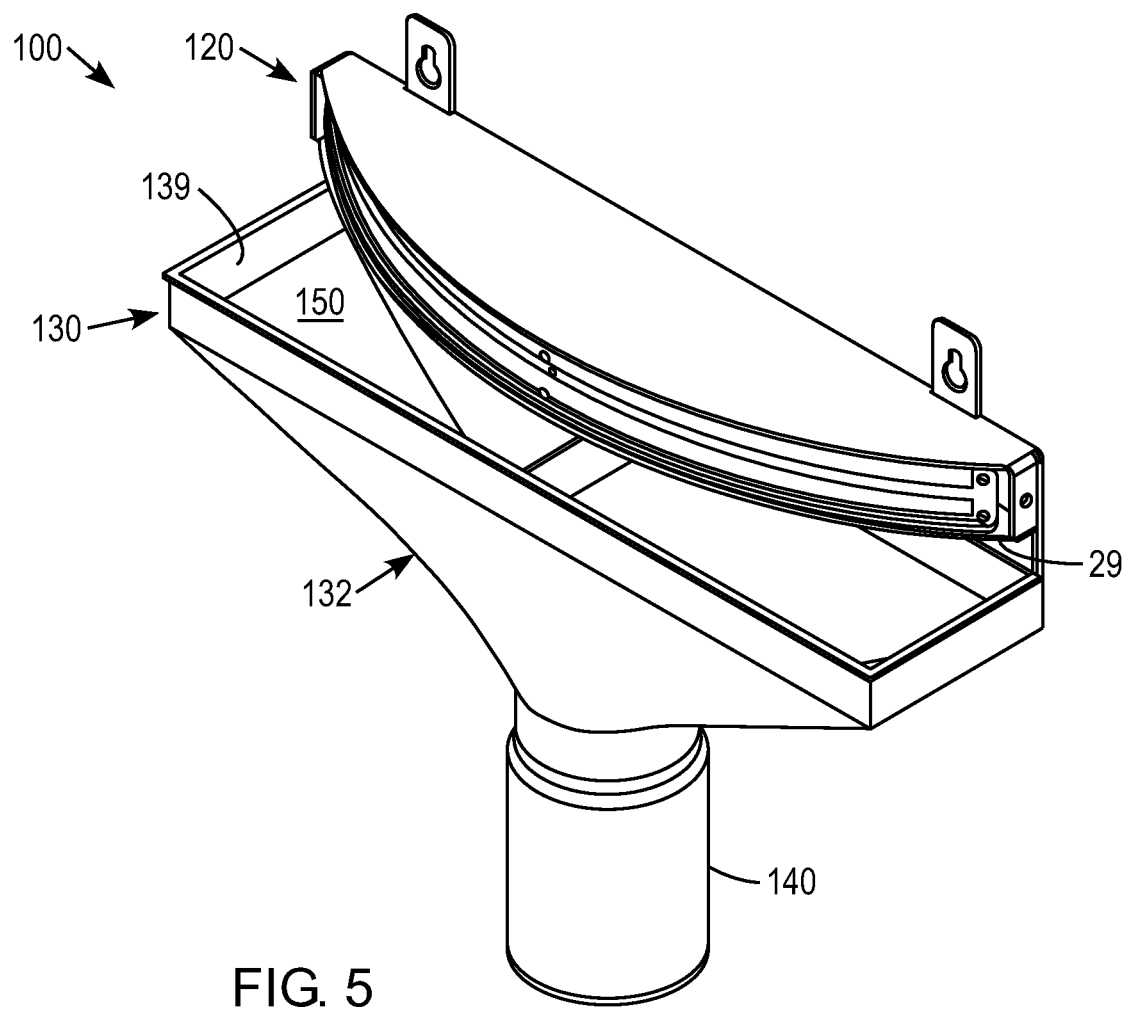
FIG. 5 is a perspective view of an insect trap having a collection jar in accordance with another embodiment.
Figure 6:
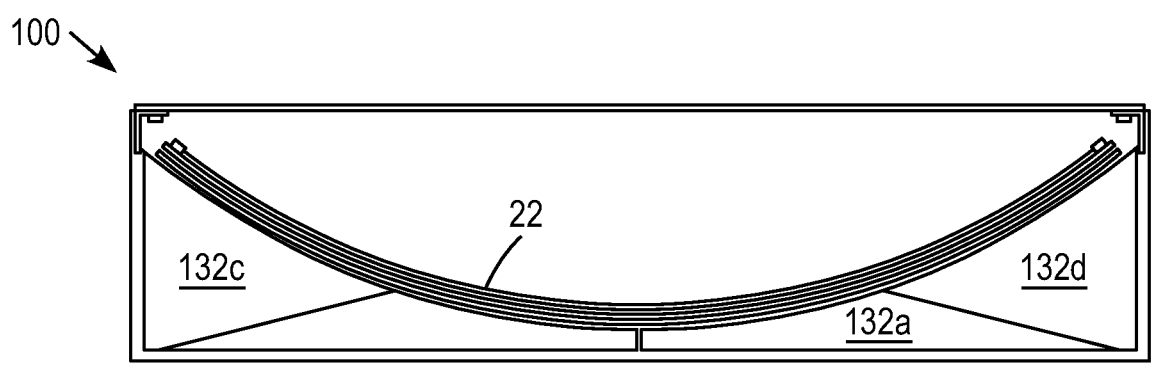
FIG. 6 is a top view of the insect trap shown in FIG. 5.
Figure 7:
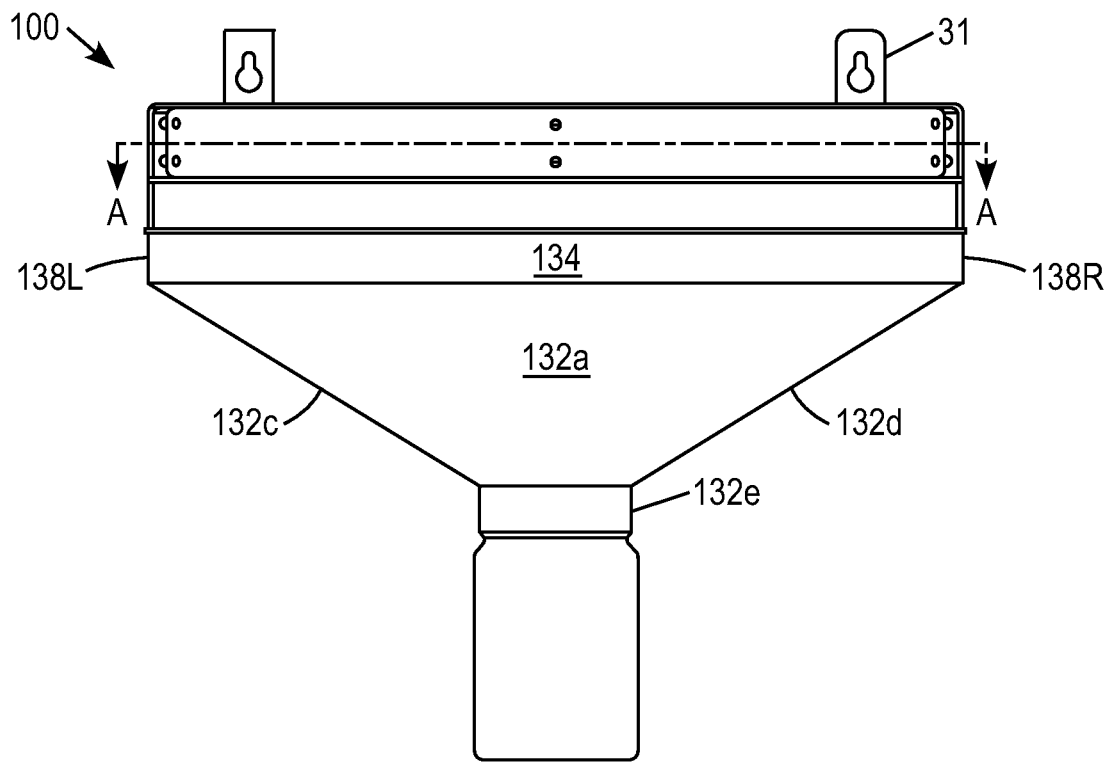
FIG. 7 is a front view of the insect trap shown in FIG. 5.

FIGS. 5-7 illustrate an insect trap 100 in accordance with a second embodiment. The insect trap 100 is similar to the insect trap 10 but instead of a glue pad for trapping insects, the inset trap 100 can stun and collect insects in a container. The insect trap 100 includes an upper housing 120 and a base housing 130 beneath the upper housing 120. The upper housing 120 is smaller than the base housing 130 and is configured to overlie the base housing 130 such that an interior of the base housing 130 is accessible through an opening 150 which extends through a front wall and a top wall of the base housing 130. Thus, light from the upper housing 120 can project horizontally in various directions and attract insects into the opening 150. In an embodiment, the insect trap 100 does not include any pesticides and instead uses light to attract insects into the insect trap 100 and physically trap the insects in a collection jar 140 attached to the base housing 130.

The upper housing 120 is the same as the upper housing 20 shown in FIGS. 1-4 which includes a curved front wall 22, a top wall 24, a left sidewall 26L, a right sidewall 26R, and a back wall 28. The top wall 24 can be a D-shaped planar wall having a straight back edge 24*a*, straight side edges 24*b*, 24*c* and a curved front edge 24*d*. The left and right sidewalls 26L, 26R can be planar rectangular walls which have about the same width as the side edges 24*b*, 24*c* and extend downwardly from the side edges 24*c*, 24*d* so as to be perpendicular to the top wall 24 and back wall 28. The back wall 28 can be a planar rectangular wall which extends downwardly from the back edge 24*a* and is perpendicular to the top wall 24. The front wall 22 can be a non-planar rectangular wall of uniform height which extends downwardly from the curved front edge 24*d* of the top wall 24.

Figure 8:
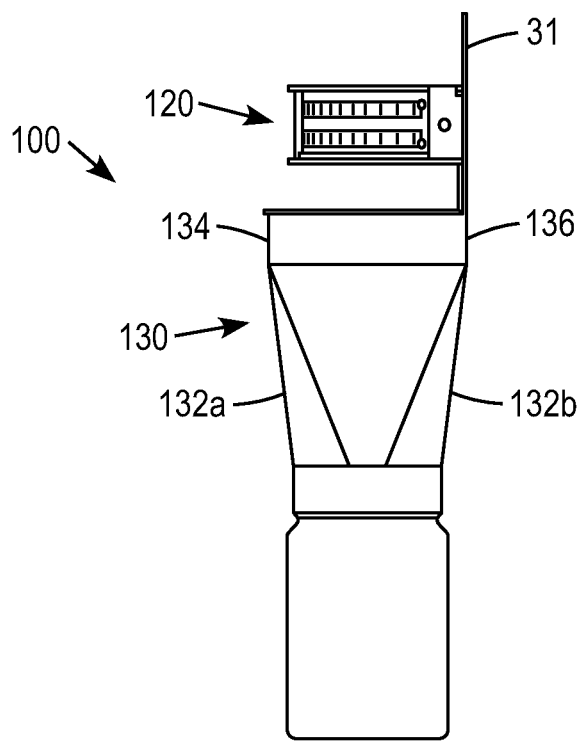
FIG. 8 is a side view of the insect trap shown in FIG. 5.

The base housing 130 is similar to the base housing 30 shown in FIGS. 1-4 but instead of a planar bottom wall and the inclined wall 40, the base housing 130 includes a funnel shaped bottom wall 132 having the collection jar 140 attached to the lower end of the bottom wall 132. As shown in FIGS. 7-8, the lower wall 132 includes a front section 132*a*, a back section 132*b*, a left section 132*c*, and a right section 132*d* which meet at a cylindrical bottom section 132*e*. The interior of the bottom section 132*e* can be threaded to allow a collection jar 140 to be screwed into the bottom section 132*e*. The upper end of the base housing 130 includes a back wall 134, a front wall 136, a left sidewall 138L, and a right sidewall 138R. The bottom wall 132 can have the same width as the upper housing 120. The side walls 138L, 138R can be planar rectangular walls having a height which is about the same height as that of the upper housing 120. The front wall 136 can be a planar rectangular wall having a height which is the same as the side walls 138L, 138R such that the opening 150 includes the space above a top edge of the front wall 136. The front wall 136 extends upwardly from the bottom wall 132 with a bottom edge of the front wall 136 adjacent the front section 132*a* of the bottom wall 132. The front wall 136 has side edges adjacent the side walls 138L, 138R and the front wall 136 is perpendicular to the side walls 138L, 138R. The back wall 134 is a planar rectangular wall having the same width as the upper housing 120 and a height about twice the height of the side walls 138L, 138R. However, the planar walls of the upper housing 120 and the base housing 130 can have non-planar shapes, if desired.

The base housing 130 can be made of sheet metal such as stainless steel sheeting which can stun insects such as cigarette beetles when they fly into surfaces of the base housing 130. The insects stunned by the impact fall or slide down the funnel shaped surfaces into the collection jar 140.

The upper housing 20, 120 can include a back wall, a left side wall, a right side wall, a top wall, a bottom wall 29 and the curved front wall wherein the top and bottom walls are oriented parallel to each other and connected to the back wall, and the side walls are oriented parallel to each other and connected to side edges of the top and bottom walls. The top wall can have a curved front edge extending outwardly away from the side edges of the top wall such that a midpoint of the curved front edge is at least four times further from the back wall than opposite ends of the curved front edge. Likewise, the bottom wall can have a curved front edge extending outwardly away from the side edges of the bottom wall such that a midpoint of the curved front edge is at least four times further from the back wall than opposite ends of the curved front edge. The curved front wall can be mounted in a recess between the top and bottom walls such that an outer surface of the curved front wall is spaced inwardly from the curved front edges of the top and bottom walls with at least one horizontal row of light emitting diodes extending across an outer surface of the curved front wall such that light from each of the light emitting diodes is projected outwardly from the upper housing at a different angle than adjacent light emitting diodes in the horizontal row of the light emitting diodes.

The base housing 30, 130 can include a back wall, left and right side walls, a front wall and a bottom wall, with upper ends of the back wall, side walls and front wall forming a rectangular the opening through which insects can enter the interior of the base housing. The inner surface of the back wall of the base housing can include an insect attracting component such as a yellow surface on the back wall. To provide the insect attracting component on a larger surface area, the insect attracting component can be located completely around the opening into the base housing by further providing the insect attracting component on inside surfaces of the side walls and front wall of the base housing. If the base housing 130 is made of metal such as stainless steel, the insect attracting component can be integrated into a rectangular frame 139 located inside the base housing adjacent the rectangular opening 150. For example, the insect attracting component can comprise a yellow surface of a rectangular frame 139 extending around the inside of the rectangular opening 150.

The upper housing can include a multi-position switch S configured to adjust power supplied to the horizontal row of light emitting diodes. For example, the switch can be located on the top wall of the upper housing. The switch can be used to adjust the brightness of the light emitting diodes to a desired level suitable for a location in which the insect trap is used. For example, if the insect trap is mounted on an interior wall of a tobacco storage facility, brightness can be controlled by moving the switch from an off position to a first position (low power position) at which half of the light emitting diodes receive power or a second position (high power position) at which all of the light emitting diodes receive power. The light emitting diodes can be exposed or covered with a UV transmissive cover 23 mounted over the curved front wall 22 on which the at least one row of light emitting diodes is mounted. In a preferred embodiment, the light emitting diodes are arranged in two horizontal rows with each horizontal row having 50 light emitting diodes.

The insect trap can be used to trap flying insects such as cigarette beetles. In a method of trapping cigarette beetles, the insect trap can be supported on an interior wall of a tobacco storage facility, power can be supplied to the horizontal row of light emitting diodes so as to project UV light in an arc outwardly of the curved front wall of the upper housing, and cigarette beetles can be trapped with the insect trapping component. In an insect trap wherein the insect trapping component is a glue board, the method can include replacing the glue board after a predetermined period of time. In another insect trap wherein the base housing includes a funnel shaped bottom wall made of metal and the insect trapping component is a container attached to the funnel shaped bottom wall, the method can include stunning the cigarette beetles due to impact with the metal surfaces of the funnel shaped bottom wall and collecting the stunned cigarette beetles in the container.

It will now be apparent to those skilled in the art that this specification describes a new, useful, and nonobvious insect trap. It will also be apparent to those skilled in the art that numerous modifications, variations, substitutes, and equivalents exist for various aspects of the insect trap that have been described in the detailed description above. Accordingly, it is expressly intended that all such modifications, variations, substitutions, and equivalents that fall within the spirit and scope of the invention, as defined by the appended claims, be embraced thereby.

We claim:

1. An insect trap useful for trapping flying insects, the insect trap comprising: an upper housing including, a planar top wall, a planar bottom wall, a planar back wall extending downward from the planar top wall to the planar bottom wall and extending perpendicular to both the planar bottom wall and the planar top wall, and a horizontal row of light emitting diodes extending across an outer surface of a curved front wall opposite the planar back wall and extending between both the planar top wall and the planar bottom wall, such that light from each of the light emitting diodes is projected outwardly from the upper housing at a different angle than adjacent light emitting diodes in the horizontal row of light emitting diodes; a base housing including, an opening through which insects can enter an interior of the base housing; and an insect trapping element facing the opening in the base housing.

2. The insect trap of claim 1, wherein the upper housing includes the back wall, a left side wall, the right side wall, a top wall, the bottom wall and the curved front wall, the top and the bottom walls oriented parallel to each other and connected to the back wall, the side walls being oriented parallel to each other and connected to side edges of the top and the bottom walls, the top wall having a curved front edge extending outwardly away from the side edges of the top wall such that a midpoint of the curved front edge is at least four times further from the back wall than opposite ends of the curved front edge, the bottom wall having a curved front edge extending outwardly away from the side edges of the bottom wall such that a midpoint of the curved front edge is at least four times further from the back wall than opposite ends of the curved front edge, the curved front wall mounted in a recess between the top and the bottom walls such that an outer surface of the curved front wall is spaced inwardly from the curved front edges of the top and the bottom walls.

3. The insect trap of claim 2, wherein the base housing includes a back wall, left and right side walls, a front wall and a bottom wall, with upper ends of the back wall, the side walls and the front wall forming a rectangular opening through which insects can enter the interior of the base housing.

4. The insect trap of claim 3, wherein an inner surface of the back wall of the base housing includes an insect attracting component.

5. The insect trap of claim 1, wherein the upper housing includes a multi-position switch configured to adjust power supplied to the horizontal row of light emitting diodes such that when the switch is in a first position only some of the light emitting diodes receive power and when the switch is in a second position all of the light emitting diodes receive power.

6. The insect trap of claim 1, wherein the upper housing includes wall mounting brackets extending upwardly from the top wall, the horizontal row of light emitting diodes comprises two horizontal rows of light emitting diodes and the upper housing includes a multi-position switch configured to adjust power supplied to the horizontal rows of light emitting diodes such that when the switch is in a first position half of the light emitting diodes receive power and when the switch is in a second position all of the light emitting diodes receive power.

7. The insect trap of claim 1, wherein the upper housing includes first and second horizontal rows of light emitting diodes and the first horizontal row of light emitting diodes is located above the second horizontal row of light emitting diodes.

8. The insect trap of claim 4, wherein the insect trapping element is a glue board located in the interior of the base housing.

9. The insect trap of claim 8, wherein the glue board is a planar glue board oriented at an angle to the back wall of the base housing.

10. The insect trap of claim 9, wherein the base housing includes an inclined wall having one end adjacent the front wall of the base housing and an opposite end adjacent the back wall of the base housing with the glue board supported on an upper surface of the inclined wall.

11. The insect trap of claim 9, wherein the insect attracting component is a yellow surface on an inner surface of the back wall of the base housing.

12. The insect trap of claim 4, wherein the insect trapping element is a container attached to the bottom wall of the base housing.

13. The insect trap of claim 12, wherein the insect attracting component is located on inside walls of the side walls and the front wall of the base housing.

14. The insect trap of claim 13, wherein the back wall of the base housing is part of a rectangular frame located inside the base housing adjacent the rectangular opening, the insect attracting component comprising a yellow surface of the rectangular frame extending around an inside of the rectangular opening.

15. The insect trap of claim 12, wherein the base housing includes a funnel shaped bottom wall having a cylindrical extension at a bottom thereof, the container removably attached to the cylindrical extension.

16. The insect trap of claim 1, wherein the upper housing includes circuitry to supply the horizontal row of light emitting diodes with DC power and each of the light emitting diodes emits ultraviolet (UV) light.

17. The insect trap of claim 16, wherein all of the light emitting diodes emit UV light at a wavelength of about 370 to 380 nm.

18. A method of trapping cigarette beetles, comprising:
supporting the insect trap of claim 1 on an interior wall of a tobacco storage facility,
supplying power to the horizontal row of light emitting diodes so as to project UV light in an arc outwardly of the curved front wall of the upper housing, and
trapping the cigarette beetles with the insect trapping element.

19. The method of claim 18, wherein the insect trapping element is a glue board and the method includes replacing the glue board after a desired period of time.

20. The method of claim 18, wherein the base housing includes a funnel shaped bottom wall made of sheet metal and the insect trapping element is a container attached to the funnel shaped bottom wall, the method including stunning the cigarette beetles due to impact with the sheet metal of the funnel shaped bottom wall and collecting the stunned cigarette beetles in the container.

* * * * *